US010061411B2

(12) United States Patent
Peretz et al.

(10) Patent No.: US 10,061,411 B2
(45) Date of Patent: Aug. 28, 2018

(54) DUAL-FUNCTION SWITCH FOR STYLUS TAIL ERASER (71) Applicant: Microsoft Technology Licensing, LLC, Redmond, WA (US)

(72) Inventors: Ahia Peretz, Rmat Gan (IL); Vadim Mishalov, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 15/242,329

(22) Filed: Aug. 19, 2016

(65) Prior Publication Data

US 2018/0052531 A1 Feb. 22, 2018

(51) Int. Cl.
G06F 3/038 (2013.01)
G06F 3/0354 (2013.01)
G06F 3/01 (2006.01)

(52) U.S. Cl.
CPC .......... *G06F 3/0383* (2013.01); *G06F 3/016* (2013.01); *G06F 3/03545* (2013.01); *G06F 2203/0384* (2013.01)

(58) Field of Classification Search
CPC ......... G06F 2203/04101; G06F 3/0317; G06F 3/033; G06F 3/0354; G06F 3/03542; G06F 3/0383; G06F 3/03545; G06F 3/0386; G06F 3/016; G06F 2203/0384; H01H 13/14
USPC .......................................... 345/179
See application file for complete search history.

(56) References Cited

U.S. PATENT DOCUMENTS 5,565,632 A * 10/1996 Ogawa ............... G06F 3/03545
                                                          73/862.041
5,571,997 A * 11/1996 Gray .................. G06F 3/03545
                                                          178/19.04
5,576,502 A * 11/1996 Fukushima ......... G06F 3/03545
                                                          178/19.01

(Continued)

FOREIGN PATENT DOCUMENTS

JP          10106389 A        4/1998
WO        2012123951 A2      9/2012
WO      WO2014073745 A1      5/2014

OTHER PUBLICATIONS

Lee, et al., "Haptic Pen: Tactile Feedback Stylus for Touch Screens", In Proceedings of the 17th Annual ACM Symposium on User Interface Software and Technology, Oct. 2004, 5 pages.

(Continued)

*Primary Examiner* — Grant Sitta
(74) *Attorney, Agent, or Firm* — Arent Fox LLP (57) ABSTRACT

The systems, methods, and techniques described herein provide for an improved stylus incorporating a dual-function switch as part of the tail eraser mechanism. A conductive resilient body, when compressed, deforms to contact one or more pairs of electrodes on a printed circuit board, thus creating electrical continuity between the electrodes. A first force causes electrical continuity between a first pair of electrodes which may initiate a first mode of the stylus, such as erase mode. A second force, greater than the first force, causes electrical continuity between a second pair of electrodes which may initiate a second mode of the stylus, such as causing a microcontroller unit to issue a command to a computing device to launch one or more applications or services.

21 Claims, 5 Drawing Sheets

(56) References Cited

U.S. PATENT DOCUMENTS

| | | | | |
|---|---|---|---|---|
| 5,581,052 A * | 12/1996 | Padula | ............... | G06F 3/03545 178/19.04 |
| 5,914,708 A * | 6/1999 | LaGrange | ............ | G06F 3/03545 178/18.06 |
| 6,303,887 B1 * | 10/2001 | Ando | ................... | H01H 13/702 200/1 B |
| 6,809,272 B2 * | 10/2004 | Yamada | ................ | H01H 13/48 200/1 B |
| 7,095,404 B2 * | 8/2006 | Vincent | .............. | G06F 3/03545 345/105 |
| 7,679,611 B2 | 3/2010 | Schena | | |
| 7,685,538 B2 | 3/2010 | Fleck et al. | | |
| 7,952,038 B1 | 5/2011 | Ando et al. | | |
| 8,780,089 B2 * | 7/2014 | Yuan | .................. | G06F 3/03545 178/19.01 |
| 9,746,943 B1 * | 8/2017 | Rost | .................... | G06F 3/03545 |
| 2006/0227121 A1 | 10/2006 | Oliver | | |
| 2007/0152982 A1 | 7/2007 | Kim et al. | | |
| 2008/0297475 A1 * | 12/2008 | Woolf | ................. | G06F 3/0233 345/163 |
| 2010/0051356 A1 * | 3/2010 | Stern | .................. | G06F 3/03545 178/19.04 |
| 2013/0236265 A1 * | 9/2013 | Diener | ................. | F16B 39/284 411/307 |
| 2013/0249870 A1 | 9/2013 | Slaby et al. | | |
| 2014/0002422 A1 * | 1/2014 | Stern | .................. | G06F 3/03545 345/179 |
| 2014/0078109 A1 * | 3/2014 | Armstrong-Muntner | ................... | G06F 3/03545 345/175 |
| 2014/0253462 A1 | 9/2014 | Hicks | | |
| 2015/0029161 A1 | 1/2015 | Koo et al. | | |
| 2015/0070330 A1 | 3/2015 | Stern | | |
| 2015/0194278 A1 * | 7/2015 | Dromph | ................ | H01H 13/48 200/513 |
| 2015/0340609 A1 * | 11/2015 | Banno | .................. | H01L 45/085 257/4 |

OTHER PUBLICATIONS

Rubino, Daniel., "Microsoft now lets you customize the buttons on Surface Pen with any apps you want", Published on: Dec. 16, 2015, Available at: <<http://www.windowscentral.com/microsoft-now-lets-you-customize-buttons-surface-pen>>, 2 pages.

"International Search Report and Written Opinion Issued in PCT Patent Application No. PCT/US2017/046673", dated Nov. 2, 2017, 12 Pages.

* cited by examiner

DUAL-FUNCTION SWITCH FOR STYLUS TAIL ERASER

BACKGROUND

Personal computers utilize various mechanisms for receiving input. For example, many personal computers allow a keyboard, a mouse, a touchpad, or other such devices to receive such input. Mobile personal computers, such as tablets, smart phones, laptops, and even many non-mobile computers, may incorporate a touch screen that can receive input directly through contact, or near-contact, with the screen.

A stylus is one preferred implement for inputting information into a computer through the touch screen. A stylus is typically shaped like a pen or a pencil and has a writing end designed for entering information, such as handwritten text or images, and a tail end that may function as an eraser to remove information from the touch screen. A stylus may additionally include a button for providing command inputs to the computer, such as resembling a right-mouse click of a traditional computer mouse. However, the button is very limited in its usefulness, takes up space on the limited-size stylus, and may require software configuration to personalize its functionality.

SUMMARY

The systems, methods, and techniques described herein provide for an improved stylus incorporating a dual-function switch as part of the tail eraser mechanism. A conductive resilient body, when compressed, deforms to contact one or more pairs of electrodes on a printed circuit board, thus creating electrical continuity between the electrodes. A microcontroller unit can detect (or measure) the electrical continuity and output an appropriate signal to a computing device, such as to enter erase mode or launch one or more applications or services.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

DETAILED DESCRIPTION

The system described herein provides a dual-function switch for a tail eraser of a stylus. The switch is responsive to two force thresholds that activate the dual functions. In some configurations, a first force activates an eraser mode in which the tail button, when contacting the touch screen, will erase information from the touch screen, (i.e. change the pixel color values of the information to be the same as the background pixel color values). A second force, greater than the first force, will activate a second mode, which may be programmable, but in some configurations, actuates a wireless transmitter to send a wireless signal. In some instances, the wireless transmitter is a Bluetooth transmitter and the second mode may be a Bluetooth low energy (BLE) mode that issues a command to a computing device. In some instances, the BLE mode issues a command to launch an intelligent personal assistant, such as Cortana™ provided by Microsoft Corporation of Redmond, Wash. In other configurations, the BLE mode issues a command to launch one or more applications stored within memory on the computing device.

The stylus described herein may be utilized with various computing devices, such as tablets, laptops, smartphones, touch pads, digital drawing pads, personal digital assistants, television, desktops, and any computing device that allows input from a user. In some configurations, the described stylus is used in conjunction with a computing device that incorporates a touch screen, such as a capacitive touch screen.

Figure 1:
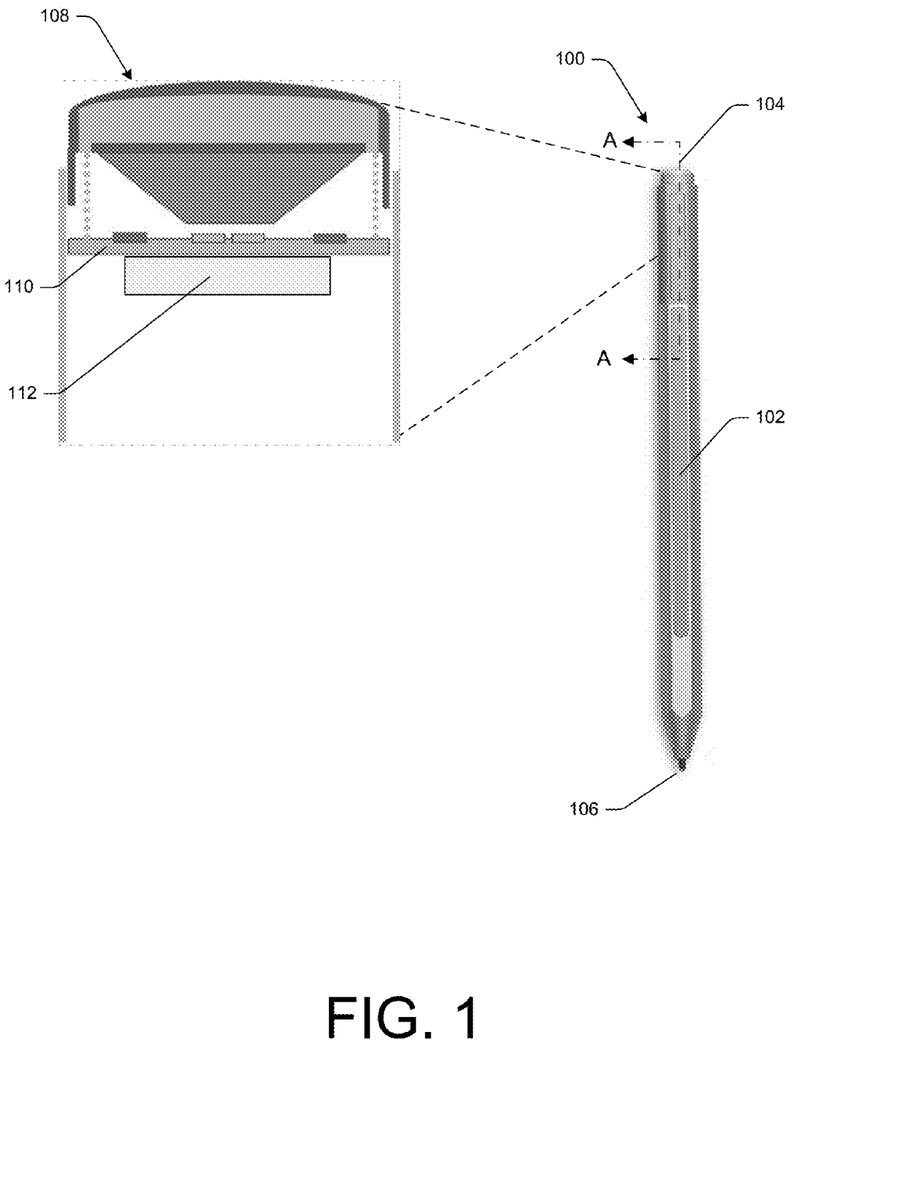
FIG. 1 is an illustration of one configuration of a stylus incorporating a dual-function switch as part of the tail eraser.

With reference to FIG. 1, an example configuration of a stylus 100 is illustrated. The stylus 100 has a barrel 102 that may be formed as a generally tubular body, a tail end 104 and an opposing writing tip 106. Of course, the barrel 102 may be formed in any shape that allows a user to hold and utilize the stylus 100. For example, the barrel 102 may have a circular, hexagonal, octagonal, or some other cross-sectional shape. It may further have a smooth surface, or incorporate a texture to improve comfort or aesthetics. Moreover, the barrel 102 may be formed of any suitable material, such as metal, plastic, composites, or a combination. In some configurations, the stylus 100 is configured to resemble a pen or pencil—a device that many users are familiar with and are comfortable using for writing or drawing.

The barrel 102 may house a power system, a communication system, a microcontroller 112, and associated circuitry. For example, the barrel 102 may contain a battery, such as an AAAA battery, one or more button cell batteries, or some other source of electricity. The communication system may include a Bluetooth transmitter and an antenna. In some configurations, the communication system incorporates a Bluetooth low energy transmitter, which may also be known as a BLE or Bluetooth Smart. The microcontroller 112 may be any suitable microcontroller unit (MCU).

The writing tip 106 may be any suitable tip. That is, any tip that is configured to enter information into a computing device incorporating a touch screen. The tail end 104 of the stylus 100 includes a tail assembly 108 and a printed circuit board (PCB) 110. In some instances, the tail assembly 108 may include a flexible printed circuit (FPC) in addition to, or in place of, the PCB. Similarly, the PCB may be omitted and conductive tape, paint, or conductive springs may be used to achieve the same functionality as described with respect to the PCB. In general, the term "circuit board," or simply "circuit," may be used to refer to a PCB or any suitable alternative therefor, a few examples of which have been provided. While any suitable variation will work in place of the PCB with many of the disclosed embodiments, for efficiency, the remainder of this disclosure will describe the use of a PCB.

Figure 2:
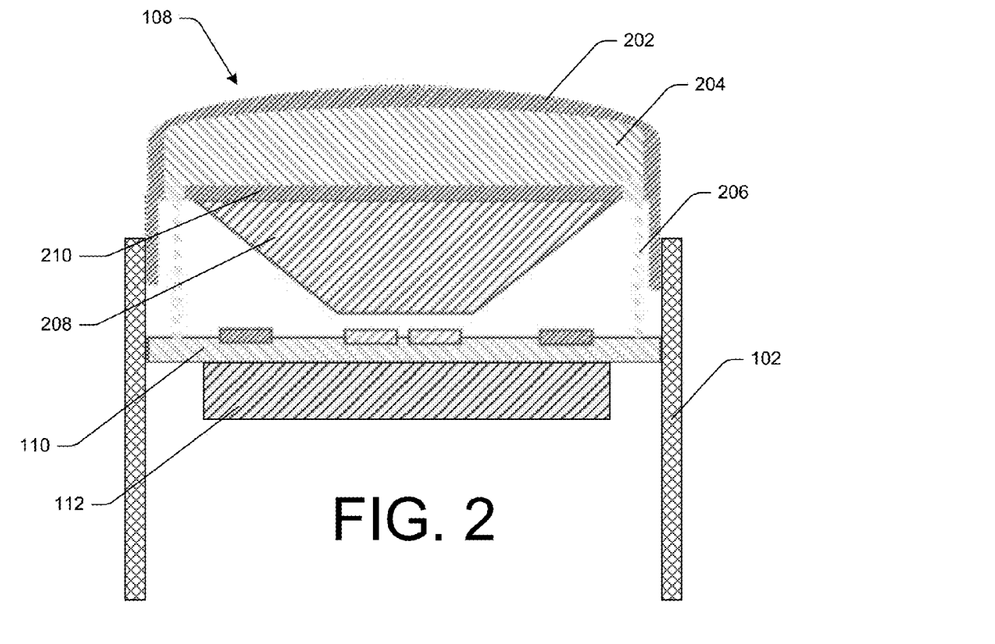
FIG. 2 is a cross-sectional view along the parting line A-A of FIG. 1.

With reference to FIG. 2, the tail assembly 108 is described in more detail. The tail assembly 108 includes a cap 202 that houses an eraser electrode 204. The cap 202 is configured to engage with the barrel 102 such that the cap 202 is retained within the barrel 102. The cap 202 may engage the barrel 102 through friction, through grooves, recesses, interferences, protrusions, or some other mechanical means of retaining the cap 202 to the barrel 102. The cap 202 may be formed of any suitable material, such as metal, plastics, composites; however, in some configurations, the cap 202 is formed of plastic through an injection molding processes.

The eraser electrode 204 may be formed of any suitable material that conducts electricity. For example, the eraser electrode 204 may be formed of metal, carbon, or a material that contains metal and/or carbon, such as rubber, plastic, or a composite material. In some configurations, the eraser electrode 204 may be electrically coupled to the PCB 110 by a conductive spring 206. The conductive spring 206, in addition to providing an electrically conductive pathway, provides a restoring force that pushes the tail assembly 108 away from the barrel 102 in an axial direction. Thus, when the tail assembly 108 is depressed, e.g. experiences a plunging force that pushes the tail assembly 108 into the barrel 102, the conductive spring 206 opposes the plunging force and when the plunging force is withdrawn, the conductive spring 206 restores the tail assembly 108 to its initial position.

A conductive resilient body 208 is carried by the cap 202 and moves therewith. The conductive resilient body 208 is preferably formed of a material having a relatively high elasticity such as, for example, synthetic rubber, silicone, thermoplastic elastomer, or natural rubber. A conductive material, such as carbon or metal, is incorporated into the conductive resilient body 208 such that the conductive resilient body 208 is electrically conductive. The conductive material may take the form of flakes, rods, whiskers, strands, particles, fibers, or any other shape that allows the conductive resilient body 208 to be resilient, such that it is able to deform under a compressive load and then return to its original shape in the absence of a compressive load.

The conductive resilient body 208 may be shaped as a column, a dome, frustroconically, or some other shape that provides the benefits and operation described hereinbelow. The conductive resilient body 208 may be separated from the eraser electrode 204 by an insulator, such as an insulating plate 210. The insulating plate 210 may be attached to the eraser electrode 204 and/or the conductive resilient body 208 through adhesives, convex/concave interferences, or may be incorporated during the manufacturing of the eraser electrode 204 and/or the conductive resilient body 208. The insulating plate 210 may be a film, a coating, or a flexible or a rigid plate and may be disposed either on the eraser electrode 204, the conductive resilient body 208, or both.

Figure 3:
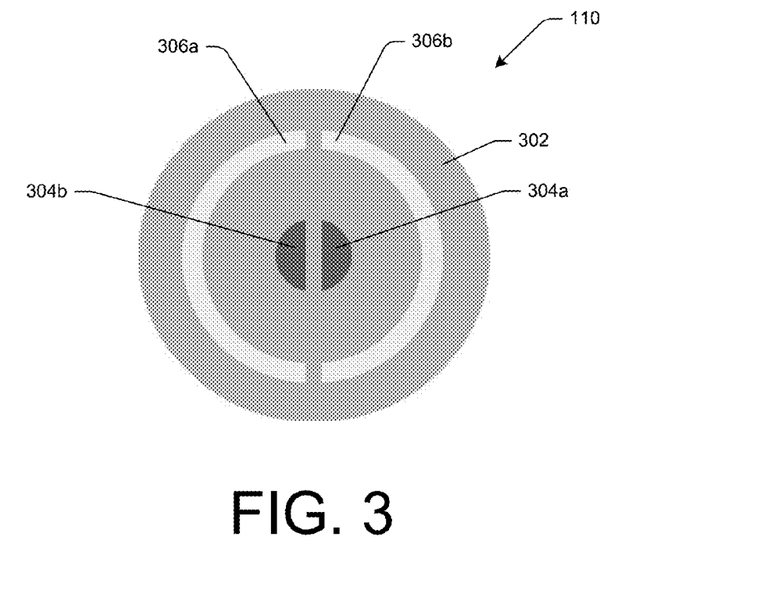
FIG. 3 is a plan view of one example of a printed circuit board incorporated into the dual function switch.

With additional reference to FIG. 3, the PCB 110 includes a substrate 302, a first pair of low force electrodes 304a, 304b, and a pair of high force electrodes 306a, 306b. While the low force electrodes 304a, 304b are described as a pair of electrodes, they may be considered a single electrode which is discontinuous. In other words, the electrode may have discrete portions that are not electrically connected together. The low force electrodes 304a, 304b are discontinuous such that there is not a conductive electrical path therebetween. Similarly, high force electrodes 306a, 306b are also discontinuous.

The PCB 110 may be formed of any shape that is configured to fit within the barrel 102. While the configurations of FIG. 3 illustrates the PCB 110 as circular, the PCB 110 could be shaped to match the cross-sectional shape of the barrel 102, or may be some other shape entirely. For example, a square PCB 110 could be configured to fit within a round barrel 102 while still providing the advantages described herein. In some implementations, the PCB 110 is fixedly mounted within the barrel 102 and the tail assembly 108 is able to move relative to the PCB 110.

Furthermore, while one particular configuration of low force electrodes 304a, 304b and high force electrodes 306a, 306b is illustrated, the electrodes could be of practically any size, shape, and configuration while providing the benefits and features described herein. Furthermore, additional electrodes could be implemented to result in multiple force levels of response. That is, electrodes could be configured on the PCB 110 to result in a low force response, a medium force response, a high force response, or practically any number of responses to various force thresholds.

Figure 4A:
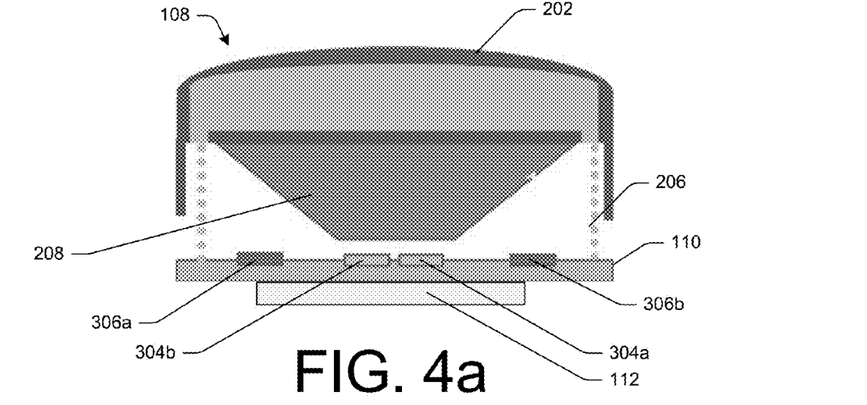
FIG. 4a is a cross-section elevational view taken along parting line A-A of FIG. 1 of one configuration showing the dual-function switch in a first hover mode.
Figure 4B:
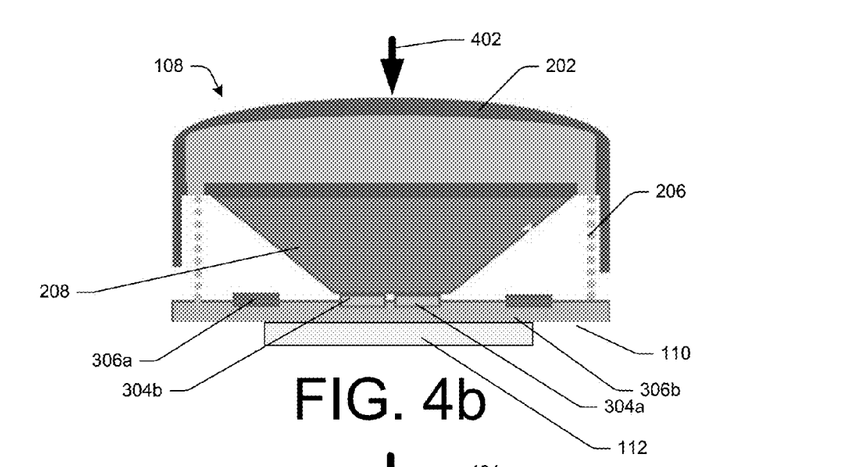
FIG. 4b is a cross-section elevational view taken along parting line A-A of FIG. 1 of one configuration showing the dual-function switch in a second mode in response to a first input force.
Figure 4C:
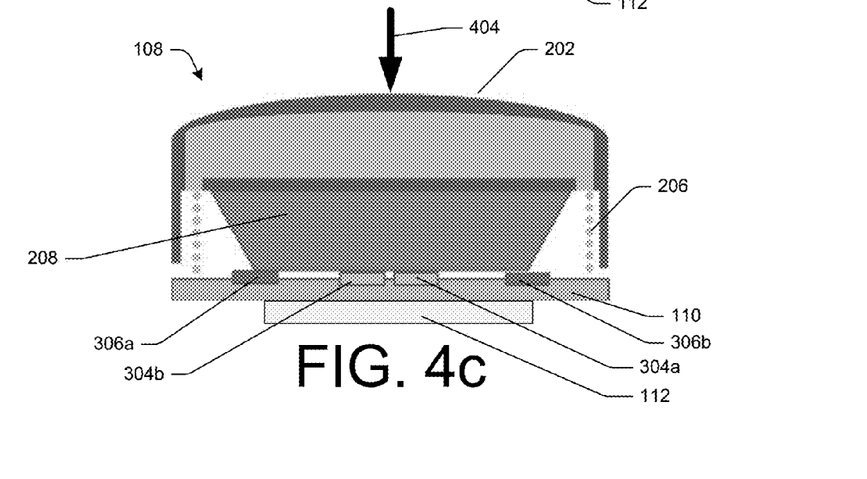
FIG. 4c is a cross-section elevational view taken along parting line A-A of FIG. 1 of one configuration showing the dual-function switch in a third mode in response to a second input force.

FIGS. 4a, 4b, and 4c show the tail assembly 108 subject to various plunging forces. According to FIG. 4a, when no plunging force is applied to the cap 202, the eraser electrode 204 is electrically coupled to the PCB 110 by the conductive spring 206. The MCU 112, through the communication system, may output a hover signal that corresponds with no force on the tail assembly. The hover signal may communicate with a computing device which may allow the computing device to determine a location on the touch screen over which the tail assembly is hovering. The computing device may provide indicia on the touch screen, such as a pointer or cursor, indicating the location at which the tail assembly is hovering over.

FIG. 4b illustrates a low plunging force 402 applied to the tail assembly 108. The low plunging force 402 is sufficient to move the tail assembly 108 within the barrel 102 toward the PCB 110. As illustrated, the tail assembly 108 moves a sufficient distance to cause the conductive resilient body 208 to contact the low force electrodes 304a, 304b, thus creating an electrical pathway therebetween. The low force electrodes 304a, 304b may comprises circuit traces on the PCB 110 and may define a gap therebetween. Thus, the gap causes electrical discontinuity between the low force electrodes 304a, 304b. As the resilient body 208 contacts the low force electrodes 304a, 304b, it bridges the gap thereby creating electrical continuity between the traces. The MCU 112 is able to measure, or at least detect, the electrical continuity between the low force electrodes 304a, 304b. In response, the MCU 112, through the communication system, outputs an erase signal. That is, a signal is output to the computing device that indicates the stylus is in an erase mode, such that the computing device detects the location(s) on the touch screen at which the cap 202 is in contact and changes the pixel color values of any information at that location to be the same as the background pixel color values.

In response to the low plunging force 402, the conductive spring 206 compresses and exudes a restoring force to the tail assembly 108. Once the low plunging force 402 is removed, the restoring force from the conductive spring 206 causes the spring to expand which returns the tail assembly 108 to its original position. By choosing a conductive spring 206 with a specific spring constant, k, and selecting a distance the tail assembly 108 must move relative to the PCB 110 in order to enter the erase mode, the low plunging force 402 required to indicate the erase mode can be selectively determined, according to Hooke's law (F=kX), where F is the required force, k is the spring constant, and X is the distance. Thus, the force required to compress the spring is proportional to the distance required.

Consequently, as illustrated in FIG. 4c, a high plunging force 404 is required to further compress the conductive spring 206 to cause the stylus to enter a second mode by causing the conductive resilient body 208 to bridge the gap between the high force electrodes 306a, 306b. As used herein, low plunging force 402 and high plunging force 404 are relative terms. That is, a high plunging force is greater than a low plunging force. In order to enter the erase mode, a low plunging force 404 need only be greater than a threshold force required to cause the conductive resilient body 208 to and make contact with the low force electrodes 304a, 304b and bridge the gap therebetween. The magnitude of the low plunging force 402 required to exceed the threshold force can be determined, and may be on the order of about 200 gram-force (0.4 lbf). Of course, these values are arbitrary and any desired threshold force can be determined and an appropriate conductive spring 206 may be selected.

As shown, a high plunging force 404 exceeds a second predetermined force such that the conductive resilient body 208 compresses and deforms against the PCB 110 and contacts both the low force electrodes 304a, 304b, and the high force electrodes 306a, 306b. The MCU 112 may be configured to measure, or detect, the electrical continuity between the high force electrodes 306a, 306b, and output a wireless signal, such as a BLE signal, in response to the high force applied to the tail assembly 108. The BLE signal may be configurable on the computing device to take desired actions. For example, in some configurations, the BLE signal may be used to launch an intelligent digital personal assistant, launch another application, or take some further action by the computing device. Of course, additional electrodes could be provided to result in additional levels of force response and there may be three, four, five, or more sets of electrodes that define electrically conductive pathways in response to various plunging forces that deform the conductive resilient body 208.

The high force threshold may be predetermined and may be any force greater than the low plunging force that causes the MCU 112, through the communication system, to output an erase signal, thus activating the erase mode of the stylus 100.

Figure 5A:
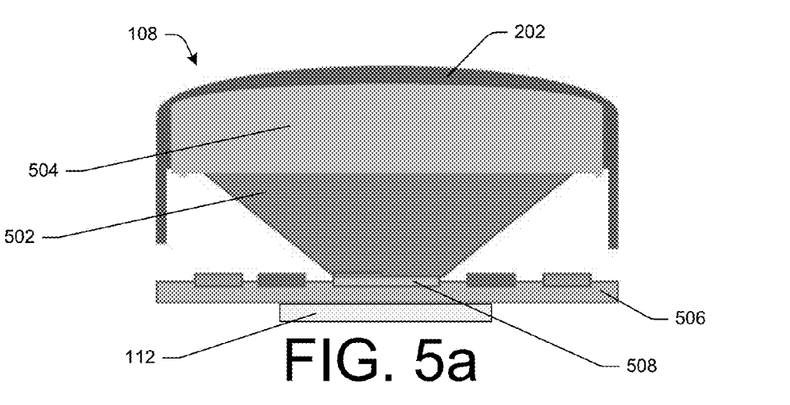
FIG. 5a is a cross-section elevational view taken along parting line A-A of FIG. 1 of another configuration showing the dual-function switch in a first hover mode.

FIG. 5a illustrates an alternative configuration of a tail assembly 108 in which the conductive resilient body 502 electrically connects the eraser electrode 504 and the PCB 506. As illustrated, the conductive resilient body 502 is in direct contact with the eraser electrode 504 and is also in direct contact with a first trace 508 on the PCB 506. Thus, even in the absence of a plunging force on the tail assembly 108, the eraser electrode 504 is in electrical contact with the PCB 506.

Figure 5B:
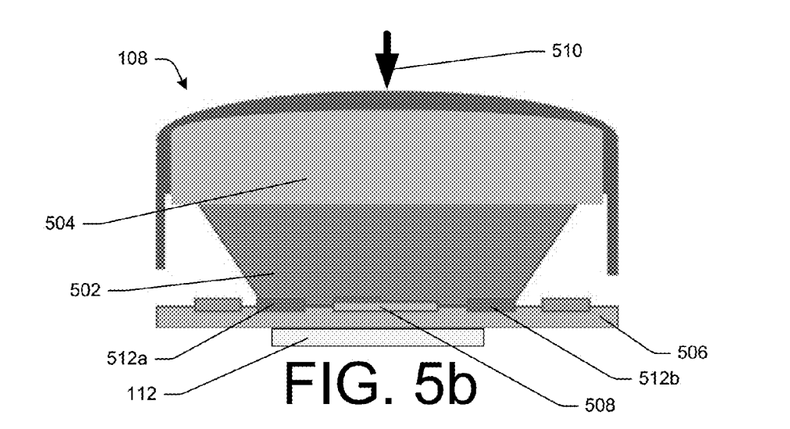
FIG. 5b is a cross-section elevational view taken along parting line A-A of FIG. 1 of another configuration showing the dual-function switch in a second mode in response to a first input force.

FIG. 5b illustrates the deformation of the conductive resilient body 502 in response to a low plunging force 510. Once the low plunging force 510 exceeds a predetermined threshold force, the tail assembly 108 is caused to move toward the PCB 506 and the conductive resilient body 502 compresses and deforms against the PCB 506 such that the conductive resilient body 502 contacts both the first electrode 508 and the low force electrodes 512a, 512b, thus causing electrical continuity therebetween. The MCU 112 can detect this electrical continuity and, through the communication system, output an erase signal to a computing device.

Figure 5C:
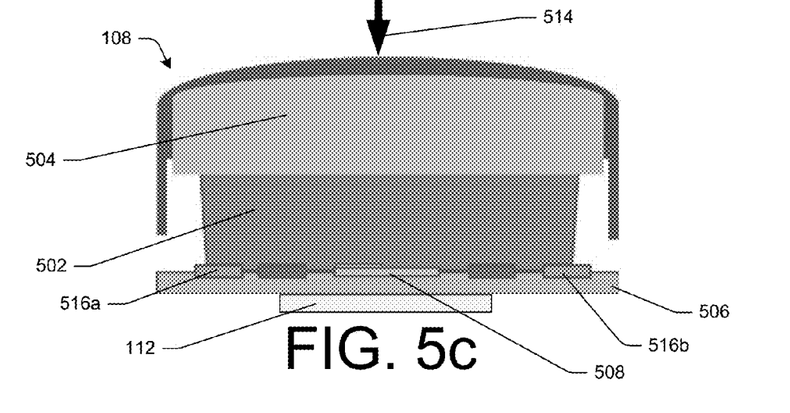
FIG. 5c is a cross-section elevational view taken along parting line A-A of FIG. 1 of another configuration showing the dual-function switch in a third mode in response to a second input force.

According to FIG. 5c, a high plunging force 514, greater than the low plunging force 510, may cause the tail assembly 108 to further move toward the PCB 506, and further compress and deform the conductive resilient body 502 such that it additionally contacts the high force electrodes 516a, 516b. The MCU 112 may detect the electrical continuity between the high force electrodes 516a, 516b and output a corresponding signal, which in some configurations is a BLU mode. The conductive resilient body 502 may be configured with a wide range of conductivities. In fact, a resistance of 10 kOhm and above has been shown to allow the conductive resilient body 502 to provide sufficient electrical continuity between the low force electrodes 512a, and 512b and the high force electrodes 516a, 516b to enable the MCU to detect the continuity.

In addition, as shown, the conductive resilient body 502 may be configured to provide a restoring force to return the tail assembly 108 to its initial position in the absence of a plunging force. That is, the conductive resilient body 502 acts as a spring that resists a plunging force and, in the absence of a plunging force, exerts a restoring force to the tail assembly 108.

Figure 6:
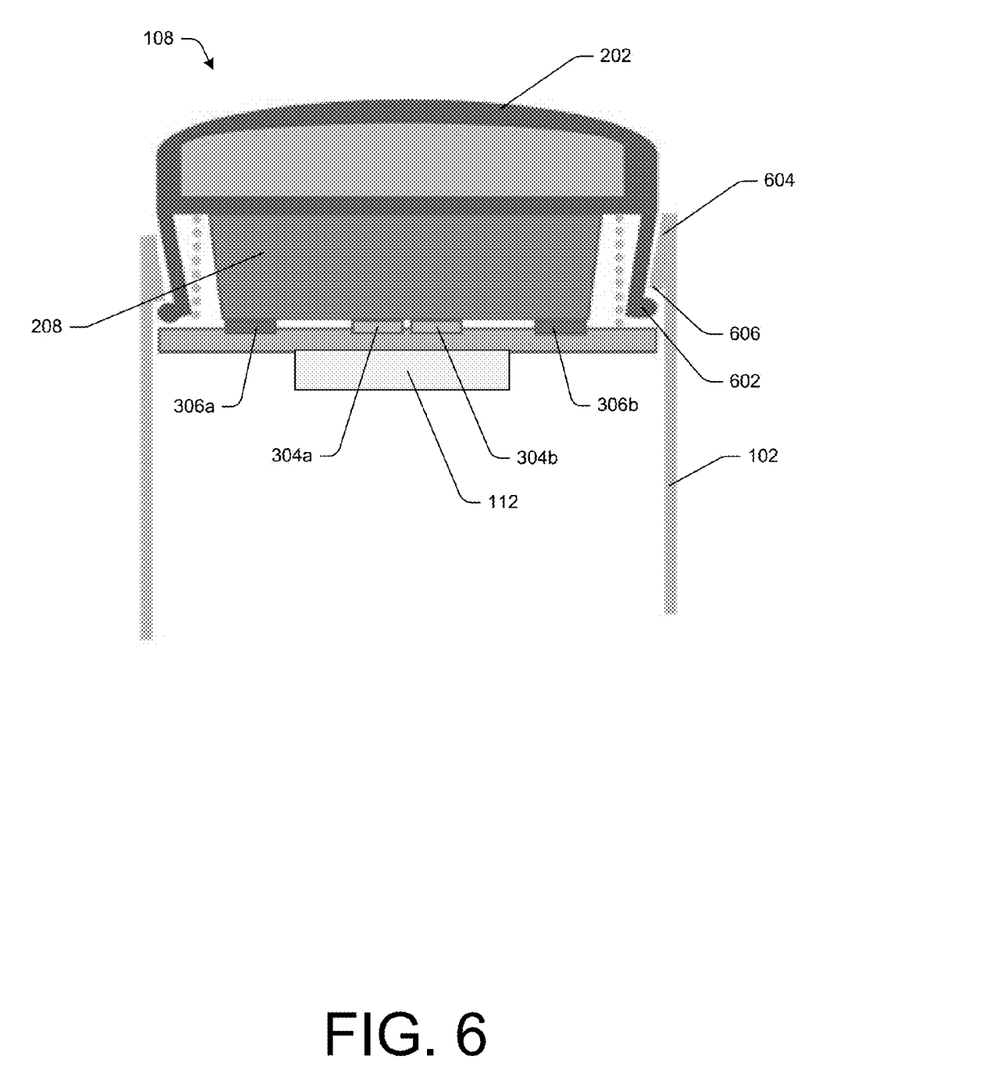
FIG. 6 is a cross-section elevational view taken along parting line A-A of FIG. 1 of another configuration illustrating an example structure for providing haptic feedback.

FIG. 6 illustrates an example configuration that provides haptic feedback to a user upon entering the BLE mode. As one example, the cap 202 includes protrusions 602 that interact with a cooperating structure of the barrel 102. The barrel 102 may include a ramp 604, which may be annular around the inner circumference of the barrel 102. As the tail assembly 108 is plunged into the barrel 102, the protrusions 602 deflect inwardly until the protrusions 602 pass beyond the ramp 604 and spring outwardly, thus creating a haptic sensation, and in some cases an audible indication, that the tail assembly 108 has been plunged to a sufficient depth to cause the conductive resilient body 208 to contact the high force electrodes 306a, 306b.

The ramp 604 may incorporate a slanted return surface 606 that allows the protrusions 602 to return beyond the ramp to an initial position of the tail assembly 108. Of course, there are a myriad of other cooperating structures that may be utilized to provide haptic or audible feedback to a user, such as grooves, a boss, electrical connectivity, or otherwise.

Example Clauses

According to some embodiments, a stylus for operating a computing device is shown and described. The stylus may comprise a barrel having a writing end and a tail end. The tail end may further comprise a printed circuit board (PCB) fixedly mounted within the barrel, the printed circuit board having a first electrode and a second electrode disposed thereon, wherein the first electrode is discontinuous and the second electrode is discontinuous. The tail end further may have a cap configured for slidable engagement within the barrel. An eraser electrode may be disposed within the cap. A conductive resilient body may be disposed within the cap and separated from the eraser electrode by an insulator. The conductive resilient body, which may be made of a conductive rubber, is preferably moveable with the cap to make surface contact with the first electrode and the second electrode in response to slidable movement of the cap into the barrel. That is, as the cap is plunged into the barrel, the conductive resilient body contacts the first electrode to form electrical conductivity along the first electrode. In response to additional plunging of the cap into the barrel, the conductive resilient body deforms and further makes contact with the second electrode, cause electrical continuity along the second electrode. A microcontroller unit may be configured to detect electrical continuity of the first electrode and the second electrode and further configured to output an erase signal in response to detecting electrical continuity of the first electrode and output a wireless signal in response to detecting electrical continuity of the second electrode.

The stylus may further include a spring disposed between the eraser electrode and the PCB, the spring configured to bias the cap and the eraser electrode away from the PCB. The spring may further electrically couple the eraser electrode to the PCB.

In some instances, electrical continuity of the first electrode occurs in response to a first plunging force on the cap that causes the conductive resilient body to make surface contact with the first electrode and bridge a gap in the first electrode. Similarly, electrical continuity of the second electrode occurs in response to a second plunging force, greater than the first plunging force, on the cap that causes the conductive resilient body to make surface contact with the second electrode and bridge a gap in the second electrode. The conductive resilient body may elastically deform against the PCB in order to make surface contact. In another instance, the conductive resilient body may be cylindrical and the PCB may be circular and the conductive resilient body may contact the first electrode in response to a first plunging distance of the cap, and may further make contact with the second electrode in response to a second plunging distance of the cap.

The stylus may include a wireless transmitter configured to output a Bluetooth low energy signal that launches a personal digital assistant on the computing device configured to receive inputs from the stylus.

According to other embodiments, a tail eraser button for a stylus includes a circuit board disposed within a barrel of the stylus, the circuit board having at least a first electrode and a second electrode disposed thereon. The first electrode may comprise a first pair of electrical traces separated by a first gap and the second electrode may comprise a second pair of electrical traces separated by a second gap. A conductive polymer may be disposed within a tail end of the stylus and positioned adjacent to the circuit board. A microcontroller may further be disposed within the barrel of the stylus and configured to detect an electrical continuity of the first electrode and the second electrode. The microcontroller may further be configured to output a first signal in response to detecting the electrical continuity between the first pair of electrical traces and output a second signal in response to detecting the electrical continuity between the second pair of electrical traces.

The tail eraser button may further include a tail assembly housing the conductive polymer. The tail assembly may be configured to move axially relative to the barrel in a plunging direction and a retracting direction. In some instances, a first plunging force applied to the tail assembly causes the conductive polymer to bridge the first gap thereby creating the electrical continuity between the first pair of electrical traces.

In response to the first plunging force which causes electrical continuity between the first pair of electrical traces, the microcontroller may output the first signal which indicates an erase mode of the stylus. A second plunging force, greater than the first plunging force, may cause the conductive polymer to deform and bridge the second gap thereby creating electrical continuity between the second pair of electrical traces.

In response to the second plunging force which causes electrical continuity between the second pair of electrical traces, the microcontroller may output the second signal, which may be a Bluetooth low energy signal.

A spring may be disposed between an eraser electrode and a third electrode on the circuit board, the spring further configured to bias the tail assembly in the retracting direction, that is, in a direction away from the interior of the barrel.

In some embodiments, the conductive polymer, in response to the first plunging force, exerts a restoring force that biases the tail assembly in the retracting direction. That is, the conductive polymer may be used in place of, or in addition to, the spring to cause the tail assembly to be biased in the retracting direction.

According to other embodiments, a stylus tail eraser may have a dual-function button disposed in a tail end of a stylus and a microcontroller disposed within the stylus. The microcontroller may be configured with instructions that cause the microcontroller to output a first signal in response to a first force being applied to the dual-function button and output a second signal in response to a second force, greater than the first force, being applied to the dual-function button.

The stylus tail eraser may further have a circuit board disposed within the stylus, the circuit board having a first electrode wherein the first electrode is discontinuous across a first gap, and a second electrode wherein the second electrode is discontinuous across a second gap. In some instances a conductive polymer coupled to the dual-function button that, in response to the first force on the dual-function button, cause the conductive polymer to contact the circuit board and create a first conductive bridge across the first gap, the conductive polymer further configured to, in response to the second force on the dual-function button, create a second conductive bridge across the second gap.

The first conductive bridge may cause electrical continuity of the first electrode and the microcontroller can be configured to detect the electrical continuity of the first electrode and output, in response to detecting the electrical continuity of the first electrode, the first signal, which may be an eraser signal.

The second conductive bridge may cause electrical continuity of the second electrode and the microcontroller can be configured to detect the electrical continuity of the second electrode and to output, in response to detecting the electrical continuity of the second electrode, the second signal, which may be a Bluetooth low energy signal.

In some cases, an outward protrusion on the dual-function button is located and configured that, when the dual-function button is depressed into the stylus, the protrusion elastically deforms and moves past an inward protrusion in the tail end of the stylus to provide haptic feedback when the dual-function button is depressed a predetermined distance. The predetermined distance may occur in response to application of the second force. Accordingly, when the button is depressed sufficiently to activate the second signal, the button "clicks" to provide haptic feedback to a user that the second signal has been output.

CONCLUSION

Although the present disclosure may use language that is specific to structural features and/or methodological acts, the invention is not limited to the specific features or acts described herein. Rather, the specific features and acts are disclosed as illustrative forms of implementing the invention.

What is claimed is:

1. A stylus for operating a computing device, comprising:
a barrel having a writing end and a tail end, the tail end further comprising:
a printed circuit board (PCB) fixedly mounted within the barrel, the printed circuit board having a first electrode and a second electrode disposed thereon, wherein the first electrode is discontinuous and the second electrode is discontinuous;
a cap configured for slidable engagement within the barrel;
an eraser electrode disposed within the cap;
a conductive resilient body disposed within the cap and separated from the eraser electrode by an insulator, the conductive resilient body moveable with the cap to make surface contact with the first electrode in response to a first slidable movement of the cap into the barrel and to make surface contact with the second electrode in response to a second slidable movement of the cap into the barrel, wherein the second slidable movement moves the cap farther into the barrel than the first slidable movement; and
a microcontroller unit configured to:
detect an electrical continuity of the first electrode and an electrical discontinuity of the second electrode;
output an erase signal in response to detecting the electrical continuity of the first electrode while detecting the electrical discontinuity of the second electrode; and
output a wireless signal in response to detecting the electrical continuity of the second electrode.

2. The stylus as in claim 1, further comprising a spring disposed between the eraser electrode and the PCB, the spring configured to bias the cap and the eraser electrode away from the PCB, the spring further configured to electrically couple the eraser electrode to the PCB.

3. The stylus as in claim 1, wherein the electrical continuity of the first electrode occurs in response to a first plunging force on the cap that causes the conductive resilient body to make surface contact with the first electrode and bridge a gap in the first electrode.

4. The stylus as in claim 3, wherein the electrical continuity of the second electrode occurs in response to a second plunging force, greater than the first plunging force, on the cap that causes the conductive resilient body to make surface contact with the second electrode and bridge a gap in the second electrode.

5. The stylus as in claim 1, wherein the wireless signal is a Bluetooth low energy signal configured to launch a personal digital assistant on the computing device configured to receive inputs from the stylus.

6. A dual-function tail eraser button for a stylus, comprising:
a circuit disposed within a barrel of the stylus, the circuit having at least a first electrode and a second electrode disposed thereon, wherein the first electrode comprises a first pair of electrical traces separated by a first gap and the second electrode comprises a second pair of electrical traces separated by a second gap;
a conductive polymer disposed within a tail end of the stylus and positioned adjacent to the circuit, the conductive polymer moveable with the eraser button to make surface contact with the first electrode in response to a first slidable movement of the eraser button into the barrel and to make surface contact with the second electrode in response to a second slidable movement of the eraser button into the barrel, wherein the second slidable movement moves the eraser button farther into the barrel than the first slidable movement; and
a microcontroller disposed within the barrel of the stylus, the microcontroller configured to:
detect an electrical continuity of the first electrode and an electrical discontinuity of the second electrodes;
output a first signal in response to detecting the electrical continuity between the first pair of electrical traces while detecting the electrical discontinuity of the second pair of electrical traces; and
output a second signal in response to detecting the electrical continuity between the second pair of electrical traces.

7. The dual-function tail eraser button as in claim 6, further comprising a tail assembly comprising the conductive polymer, the tail assembly configured to move axially relative to the barrel in a plunging direction and a retracting direction, wherein a first plunging force applied to the tail assembly causes the conductive polymer to bridge the first gap thereby creating the electrical continuity between the first pair of electrical traces.

8. The dual-function tail eraser button as in claim 7, wherein the microcontroller, in response to detecting the electrical continuity between the first pair of electrical traces, outputs the first signal, the first signal indicating an erase mode of the stylus.

9. The dual-function tail eraser button as in claim 7, wherein a second plunging force, greater than the first plunging force, causes the conductive polymer to deform and bridge the second gap thereby creating the electrical continuity between the second pair of electrical traces.

10. The dual-function tail eraser button as in claim 9, wherein the microcontroller, in response to detecting the electrical continuity between the second pair of electrical traces, outputs the second signal, the second signal comprising a Bluetooth low energy signal.

11. The dual-function tail eraser button as in claim 7, further comprising a spring disposed between an eraser electrode and a third electrode in the circuit, the spring further configured to bias the tail assembly in the retracting direction.

12. The dual-function tail eraser button as in claim 7, wherein the conductive polymer, in response to the first plunging force, exerts a restoring force that biases the tail assembly in the retracting direction.

13. A stylus tail eraser, comprising:
a dual-function button disposed in a tail end of a stylus;
a microcontroller disposed within the stylus, the microcontroller configured with instructions that cause the microcontroller to:
output a first signal in response to a first force being applied to the dual function button;

output a second signal in response to a second force, greater than the first force, being applied to the dual-function button;
a circuit disposed within the stylus, the circuit having a first electrode that is discontinuous across a first gap, and a second electrode that is discontinuous across a second gap; and
a conductive polymer coupled to the dual-function button that, in response to the first force on the dual-function button, causes the conductive polymer to contact the circuit and create a first conductive bridge across the first gap, the conductive polymer further configured to, in response to the second force on the dual-function button, create a second conductive bridge across the second gap.

14. The stylus tail eraser as in claim 13, wherein the first conductive bridge causes electrical continuity of the first electrode and the microcontroller is configured to detect the electrical continuity of the first electrode and output, in response to detecting the electrical continuity of the first electrode, the first signal.

15. The stylus tail eraser as in claim 14, wherein the first signal is an eraser signal.

16. The stylus tail eraser as in claim 13, wherein the second conductive bridge causes electrical continuity of the second electrode and the microcontroller is configured to detect the electrical continuity of the second electrode and to output, in response to detecting the electrical continuity of the second electrode, the second signal.

17. The stylus tail eraser as in claim 16, wherein the second signal is a Bluetooth low energy signal.

18. The stylus tail eraser as in claim 13, further comprising an outward protrusion on the dual-function button that, when the dual-function button is depressed into the stylus, elastically deforms and moves past an inward protrusion in the tail end of the stylus to provide haptic feedback when the dual-function button is depressed a predetermined distance.

19. The stylus tail eraser as in claim 18, wherein the predetermined distance occurs in response to application of the second force.

20. A stylus for operating a computing device, comprising:
a barrel having a writing end and a tail end, the tail end further comprising:
a printed circuit board (PCB) fixedly mounted within the barrel, the printed circuit board having a first electrode and a second electrode disposed thereon, wherein the first electrode is discontinuous and the second electrode is discontinuous;
a cap configured for slidable engagement within the barrel;
an eraser electrode disposed within the cap;
a conductive resilient body disposed within the cap and separated from the eraser electrode by an insulator, the conductive resilient body moveable with the cap to make surface contact with the first electrode and the second electrode in response to slidable movement of the cap into the barrel; and
a microcontroller unit configured to detect electrical continuity of the first electrode and the second electrode and further configured to output an erase signal in response to detecting electrical continuity of the first electrode and output a wireless signal in response to detecting electrical continuity of the second electrode;
wherein the electrical continuity of the first electrode occurs in response to a first plunging force on the cap that causes the conductive resilient body to make surface contact with the first electrode and bridge a gap in the first electrode; and
wherein the electrical continuity of the second electrode occurs in response to a second plunging force, greater than the first plunging force, on the cap that causes the conductive resilient body to make surface contact with the second electrode and bridge a gap in the second electrode.

21. A dual-function tail eraser button for a stylus, comprising:
a circuit disposed within a barrel of the stylus, the circuit having at least a first electrode and a second electrode disposed thereon, wherein the first electrode comprises a first pair of electrical traces separated by a first gap and the second electrode comprises a second pair of electrical traces separated by a second gap;
a conductive polymer disposed within a tail end of the stylus and positioned adjacent to the circuit;
a microcontroller disposed within the barrel of the stylus, the microcontroller configured to detect an electrical continuity of the first electrode and the second electrode, the microcontroller further configured to output a first signal in response to detecting the electrical continuity between the first pair of electrical traces and output a second signal in response to detecting the electrical continuity between the second pair of electrical traces; and
a tail assembly comprising the conductive polymer, the tail assembly configured to move axially relative to the barrel in a plunging direction and a retracting direction, wherein a first plunging force applied to the tail assembly causes the conductive polymer to bridge the first gap thereby creating the electrical continuity between the first pair of electrical traces.

* * * * *